J. R. & J. H. JOHNSON.
Corn-Planter.

No. 223,353. Patented Jan. 6, 1880.

UNITED STATES PATENT OFFICE.

JOHN R. JOHNSON AND JOHN H. JOHNSON, OF SMYRNA, OHIO.

CORN-PLANTER.

SPECIFICATION forming part of Letters Patent No. 223,353, dated January 6, 1880.

Application filed November 4, 1879.

*To all whom it may concern:*

Be it known that we, JOHN R. JOHNSON and JOHN H. JOHNSON, of Smyrna, in the county of Harrison and State of Ohio, have invented certain new and useful Improvements in Corn-Planters; and we do hereby declare that the following is a full, clear, and exact description thereof, reference being had to the accompanying drawings, and to the letters of reference marked thereon, in which—

Figure 1:
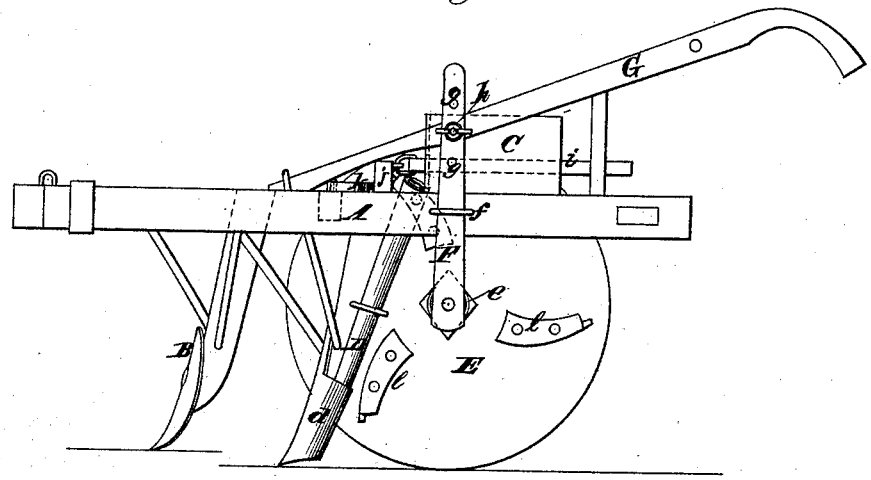
Figure 2:
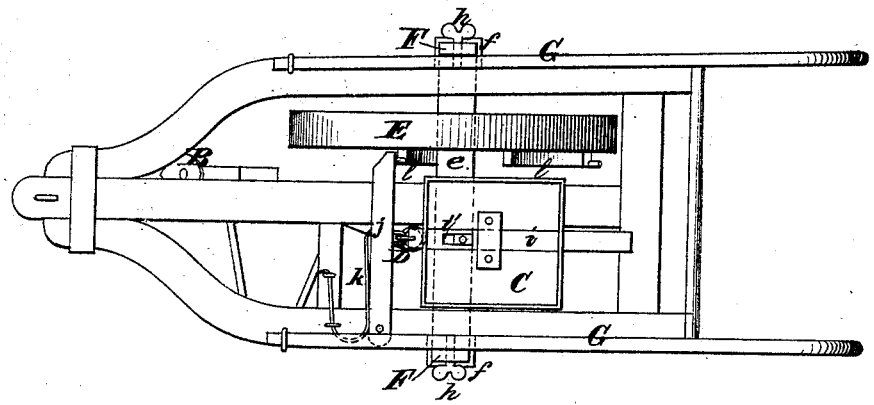

Figure 1 is a side view of our improved corn-planter, and Fig. 2 is a plan view of the same.

This invention has relation to certain improvements in corn-planters; and it consists in rendering the frame carrying the plow-shovel, seed-box, and seed-spout, with drill, vertically adjustable to regulate the depth of plowing or opening of the furrow, substantially as hereinafter more fully set forth.

To enable others skilled in the art to which our invention appertains to make and use the same, we will proceed to describe its construction and operation.

In the accompanying drawings, A marks the frame carrying the plow-shovel B, the seed-box C, and the seed-spout D, with the drill d, all connected and disposed in position thereto in the usual way.

E is the seed-slide operating-wheel, secured upon an axle, e, which bears in the lower ends of two standards, F F, adjustably connected to the frame A. The standards F F extend up through staples f f, secured to the sides of the frame A, while farther upward they are each provided with a number of adjusting perforations or holes, g g, through which are passed adjusting screws or pins h h, which enter coincident apertures in the handles G G of the planter. There are two of these handles secured upon and in line with the parallel side pieces of the frame A, to permit the upper portions of the standards F to rest against them, and to occupy a position to receive the adjusting and holding screws or pins h h.

It will be seen that we thus provide an extremely simple means which serves to both secure the frame in position and to permit its vertical adjustment by the same medium. This adjustment of the parts permits the regulating of the depth of plowing or opening of the furrow to receive the seed or corn conducted thereto by the spout D, having the drill d.

By extending the standards up alongside of and adjusting them at the handles the standards are provided with two points of bearing, one at the side pieces of the frame, within the staples, and the other against the handles by means of the pins and perforations, which also afford means for their vertical adjustment, as above described.

In the seed or corn box C is adjusted the dropping-slide i, having an aperture or hole, i', in its forward end, which feeds the seed in quantities into the spout D as it is operated, as presently set forth. The forward end of this slide is connected to a bar or lever, j, hinged to the frame A, and acted upon by a spring, k, with one end suitably fastened upon the frame A. The wheel E, upon which the planter is also transported, and which is provided with a series of knockers or cams, l l, placed at suitable intervals apart, operates the lever of the seed-slide by means of its cams l, so as to cause said slide, as the planter is in motion, to effect the dropping of the seed through the spout D and drill d.

We are aware that, broadly, the regulating of the depth of planting or plowing, by the use of standards or pendents adjustably connected either to the roller or wheel or to the frame or beam, is not new, and we therefore make no claim to such device.

Having thus described our invention, we claim and desire to secure by Letters Patent—

In a corn or seed planter, the combination, with the frame A, provided with the staples or eyes f, and having the handles G, provided each with an aperture or perforation, of the standards F, connected to the wheel-axle e, and extending up through the staples f, and thence extended up alongside of the handles G, and provided with adjusting-perforations g and pins or screws h entering the perforated handles G, as shown and described.

In testimony whereof we hereto affix our signatures in presence of two subscribing witnesses.

JOHN R. JOHNSON.
JOHN H. JOHNSON.

Witnesses:
M. M. KNOX,
H. H. KNOX.